April 19, 1960  G. C. R. MATHIESON  2,933,236
ROTARY DYNAMIC COMPRESSORS

Filed Dec. 4, 1956  2 Sheets-Sheet 2

United States Patent Office 2,933,236
Patented Apr. 19, 1960

2,933,236

ROTARY DYNAMIC COMPRESSORS

George Cameron Reid Mathieson, near Ferriby, East Yorkshire, England, assignor to Power Jets (Research & Development) Limited, London, England, a company of Great Britain Application December 4, 1956, Serial No. 626,106

Claims priority, application Great Britain December 9, 1955

5 Claims. (Cl. 230—114)

The invention relates to rotary dynamic compressors.

When dynamic compressors are operating under certain conditions of mass flow of working fluid and pressure ratio or rotational speed they become prone to the phenomenon known as surging. That is to say, the working fluid which normally follows a predictable path through the compressor becomes unstable and oscillates causing the pressure to fall considerably. The limiting condition between stable and unstable operation may be defined in a graphical representation of the characteristics of a dynamic compressor by a curve known as the surge line. This line has been indicated by the reference letter S in Figure 1 of the accompanying drawings. (This figure will be explained hereinafter.) The surge line thus defines an operational limit of the compressor. The invention is concerned with the control of a rotary compressor within the operational limit defined by the surge line.

According to the invention a gas compressor plant compressor plant comprises a rotary compressor having a row of stationary vanes, control means operable to vary the mass-flow of working fluid through the compressor, a first pressure tapping at the leading edge of one of the stationary vanes, a second pressure topping at the throat of the working fluid passage between two adjacent stationary vanes, and a pressure responsive element responsive to pressures sensed by said tappings and movable to actuate said mass-flow control means.

The first pressure tapping may comprise a hole in the leading edge of a stationary vane and facing in a direction towards the approaching working fluid, said first tapping thereby being sensitive to total pressure head at the leading edge of the vane. The second pressure tapping may comprise an opening in a wall of the throat of the working fluid passage between two adjacent vanes and facing transversely to the direction of flow of working fluid, the said second pressure tapping thereby being sensitive to static pressure head at the throat.

Preferably the pressure responsive element is contained within a housing, forming two pressure chambers separated by the element and communicating one with the first pressure tapping and the other with the second pressure tapping. The pressure responsive element may comprise a piston mounted for sliding movement in the housing. Adjustable stop means may be provided to limit the travel of the piston. At least one of the pressure chambers may have a valve controlled bleed operated in response to an operating condition of the compressor, e.g. pressure at a third tapping in the compressor.

Where the compressor is of the axial flow type the stationary vanes are stator blades of the compressor and where the compressor is of the centrifugal flow type the stationary vanes are diffuser vanes of the compressor.

By way of example the invention will now be described with reference to the accompanying drawings, in which.

Figure 1:
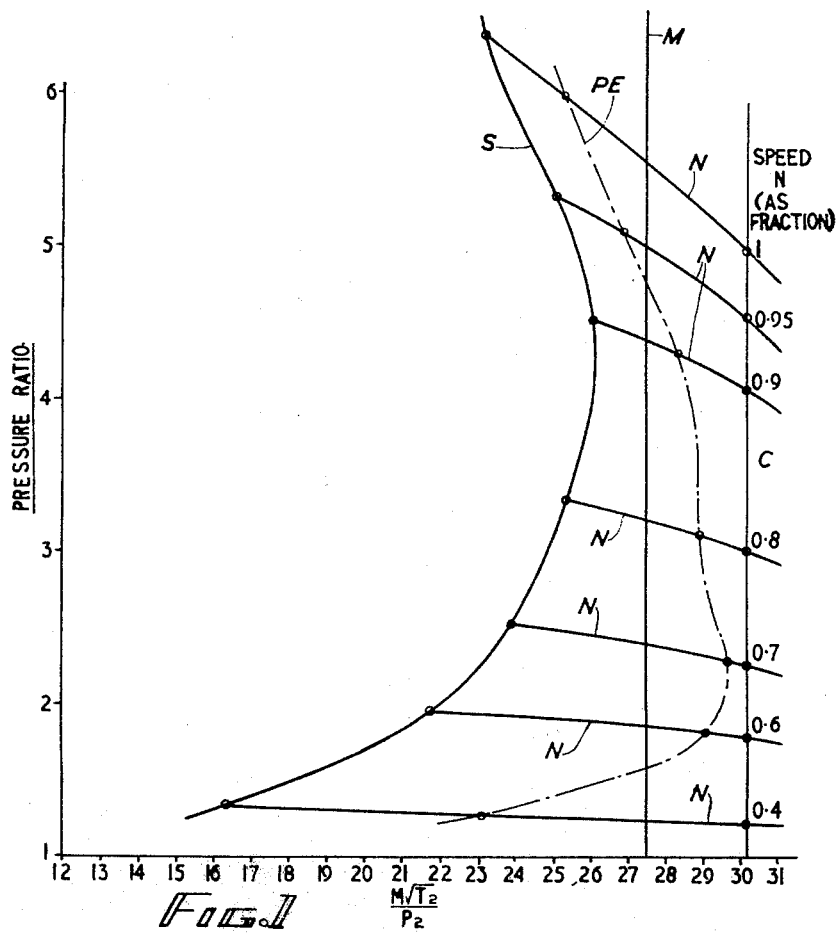
Figure 1 shows the characteristics of a typical axial flow compressor.

The compressor characteristics shown in Figure 1 have been obtained by plotting pressure ratio or rotational speed against the quantity $$\frac{M\sqrt{T_2}}{P_2}$$

where $M$ is the mass flow, $T_2$ is the outlet temperature and $P_2$ is the outlet pressure. The surge line S is obtained by joining the ends of the constant speed characteristics N. This line S will vary in shape according to the design of the compressor, but will be of the same general form for most axial flow compressors. The speeds of the constant speed characteristics N have been shown as fractions of the speed of the highest line N. When the compressor is operating at pressure ratio or speed and mass-flow represented by points to the left of the surge line as viewed in Figure 1, the compressor will surge, that is the operation will be unsteady and will be accompanied by noisy operation and considerable drop in pressure output. Operation to the right hand side of Figure 1 will be stable. To the right of the surge line, a vertical line C has been shown. This is the "choking line" and indicates the mass flow through the compressor at which choking will occur. This is determined by the throat dimensions of the final row of stator blades. The actual choking flow is normally calculated as being 0.97 of the theoretical flow at sonic velocity and frictionless flow, 0.97 being a typical discharge coefficient. When a compressor is operated beyond the choking line the efficiency will drop. Therefore the operation of the compressor should be such that for stable and efficient operation the pressure ratios and the corresponding values of $$\frac{M\sqrt{T_2}}{P_2}$$

must lie between the surge line S and the choking line C.

It should be noted here that characteristics can be plotted in a similar way for radial flow compressors. The coefficient of discharge used to calculate the choking value of $$\frac{M\sqrt{T_2}}{P_2}$$

being 0.95 for diffuser throats.

Also in Figure 1 the peak efficiency line P.E. has been plotted. This is obtained by plotting the values of $$\frac{M\sqrt{T_2}}{P_2}$$

giving the greatest or peak efficiency at various values of pressure ratio (or speed). In accordance with the invention the compressor may be operated in a predetermined manner. For example, just to the right of the surge line, with the aid of an anti-surge device, to be described hereinafter, or along the peak efficiency curve itself.

It can be shown that the non-dimensional flow quantity $$\frac{M\sqrt{T}}{AP}$$

where A is the flow area at the position where the pressure and temperature are measured is accompanied by a certain value of the ratio of static to total pressure in the cross-section of area A and also by a certain value of Mach number. Therefore by measuring the ratio of static to total pressures or the Mach number, the value $$\frac{M\sqrt{T}}{AP}$$

can be determined. If the cross-section is fixed in area then the quantity $$\frac{M\sqrt{T}}{AP}$$

can be determined. At the compressor outlet region, this is the quantity $$\frac{M\sqrt{T_2}}{P_2}$$

used as the abscissa of Figure 1. The compressor can therefore be adjusted to keep the quantity $$\frac{M\sqrt{T_2}}{P_2}$$

constant for all pressure ratios (or speeds) by automatic correction whenever the ratio of static to dynamic pressure at the outlet of the compressor alters. The constant value of $$\frac{M\sqrt{T_2}}{P_2}$$

can conveniently be chosen so as to be equal to the mean of the peak efficiency values over the whole operating range of the compressor. Such a mean operating line has been indicated on the figure as M. The constant operating value of the quantity $$\frac{M\sqrt{T_2}}{P_2}$$

could be chosen nearer to the surge line S, so that the compressor is just free from surging. A suitable value of $$\frac{M\sqrt{T_2}}{P_2}$$

would be 26.5.

An advantage of the constant operating value method of operation is that the control is independent of rotational speed and can therefore be applied to a two rotor compressor in which, at a certain speed, one rotor (but not necessarily the other) may suffer from adverse flow conditions.

The constant operating value method of operation may be combined with the method in which the peak efficiency curve P.E. is followed. For example at lower pressure ratios the line M may be followed and then at higher pressure ratios say above 4.75 the peak efficiency curve P.E. may be followed.

As has been already explained, the value of $$\frac{M\sqrt{T_2}}{P_2}$$

may be controlled by measuring the ratio of the static to total pressure ratio at a point in the compressor. It is convenient that the ratio should be measured at the point of highest velocity or smallest area i.e. in the throat of an inter-blade passage in a row of stator blades of an axial flow compressor or in the diffuser ring of a radial flow compressor.

Figure 2:
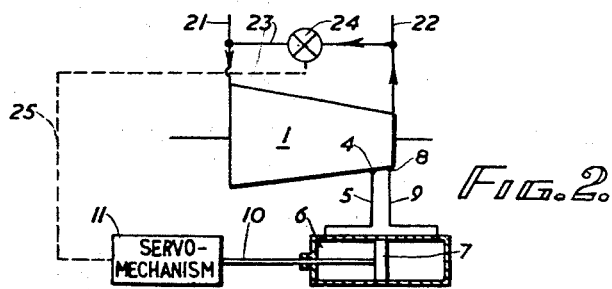
Figure 2 is a diagram showing a compressor having a device for varying the mass-flow through the compressor.

Figure 2 shows a pressure detecting device and mass-flow controlling means in an axial flow compressor. The compressor 1 has an inlet duct 21 and an outlet duct 22. Connected between the ducts 21 and 22 there is a by-pass duct 23 through which some of the compressed gas delivered by the compressor may be returned to the inlet duct 21. The quantity of gas returned through the by-pass duct depends upon the setting of a variable valve 24. The valve 24 is controlled by a servo-mechanism 11 through a connection shown by the broken line 25. The servo-mechanism 11 is itself controlled by a pressure-responsive device comprising a cylinder 6 and a piston 7 slidable therein and connected to the servo-mechanism 11 by a piston-rod 10. The cylinder 6 is connected by ducts 5 and 9 to pressure tappings 4 and 8 respectively in a stator blade row of the compressor 1. The pressure tappings 4 and 8 are shown in more detail in Figure 3.

Figure 3:
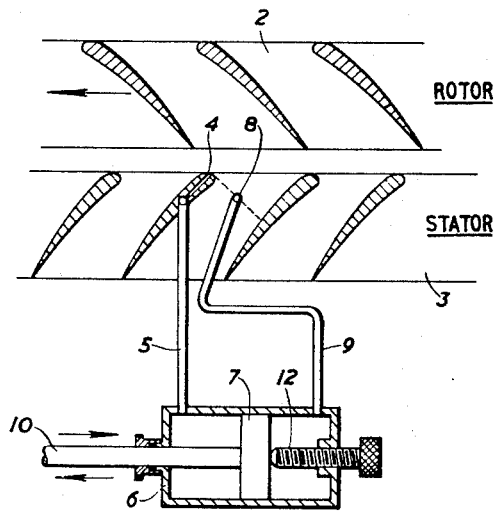
Figure 3 shows in detail part of Figure 2.

In Figure 3 a row of rotor blades of the compressor is shown by reference 2 and the row of stator blades is shown by reference 3. One of the stator blades of the last row 3 has in its leading edge the pressure tapping 4 which is constituted by a hole 4 open in the direction of the fluid flow and extending in the downstream direction. This tapping measures the total pressure. The hole 4 is connected by the duct 5 to one end of the cylinder 6 containing the piston 7. The tapping 8 is constituted by a hole 8 drilled in the inner or outer cylindrical casing walls of the working fluid passage in alignment with the throat of the inter-blade passage. This hole 8 is connected by the duct 9 to the other end of the cylinder 6, the piston 7 being positioned between the openings of the ducts 5 and 9. The piston is connected by means of the piston rod 10 to the servo-mechanism 11 which actuates the valve 24 to change the mass-flow through the compressor. The piston and piston rod areas are chosen so that the piston is balanced at a desired constant value of $$\frac{M\sqrt{T_2}}{P_2}$$

A stop 12 may be provided to act as an anti-surge device to limit the movement of the piston in one direction. The stop 12 is set so that the piston 7 can only move if the value of $$\frac{M\sqrt{T_2}}{P_2}$$

falls below a certain value, but cannot move when the value of $$\frac{M\sqrt{T_2}}{P_2}$$

rises above the value for which the stop is set.

When the mass-flow changes to cause deviation from the desired constant value of $$\frac{M\sqrt{T_2}}{P_2}$$

the ratio of the static to total pressure varies and the piston moves to the right or to the left when the mass-flow rises or falls respectively. Movement of the piston rod 10 actuates the valve 24 via the servo-mechanism 11 to alter the mass-flow to restore the design value of $$\frac{M\sqrt{T_2}}{P_2}$$

If the constant value of $$\frac{M\sqrt{T_2}}{P_2}$$

has been chosen close to the surge line, then the anti-surge stop 12 is employed. This allows movement of the piston to restore the mass-flow, if the mass-flow drops below the value giving the design value of $$\frac{M\sqrt{T_2}}{P_2}$$

but does not allow movement of the piston to correct the mass-flow if the mass-flow rises above the value giving design value of $$\frac{M\sqrt{T_2}}{P_2}$$

Figure 4:
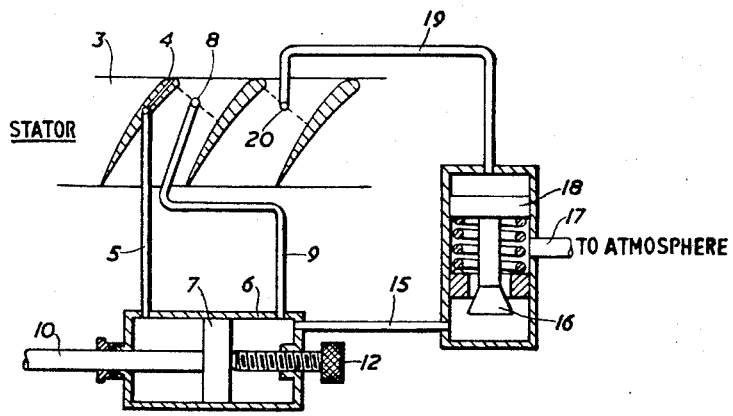
Figure 4 is a modification of part of Figure 3.

Figure 4 shows a modification of Figure 3 which allows the mass-flow to deviate from the value giving the constant value of $$\frac{M\sqrt{T_2}}{P_2}$$

to follow a curve such as the peak efficiency curve P.E. The device shown in Figure 4 introduces a bleed duct 15, controlled by a valve 16 and communicating when open with the atmosphere at 17. The valve 16 is operated by a spring-loaded piston 18 responsive to pressure in a duct 19 which is connected to a tapping 20 in the compressor delivery duct or in a throat of the stator row 3. The tapping 20 has been shown in a different throat than that occupied by tapping 8. It may be convenient to place the tapping 8 and 20 in the same throat, in which case a single tapping connected to both ducts 9 and 19 would suffice. Alternatively the valve 16 may be opened or closed in response to rotational speed.

The controlled bleed operates at pressure ratios (or speeds) above a predetermined value; say 4.75 in Figure 1. At this pressure ratio, the delivery pressure is sufficient to overcome the spring and to cause the piston 18 to move downwards as viewed in Figure 4 and to open the valve 16. The working fluid on the right hand side of the piston 7 then leaks through duct 15, valve 16 and opening 17 to atmosphere and so the piston 7 will not move to the left until a value of the ratio of static to total pressure, higher than that available without the bleed duct 15, has been obtained. That is to say, the piston 7 will not move to the left until the mass-flow drops below the value at which the piston 7 could move if the duct 15 had not been present. With increasing pressure ratio, the valve 16 will be opened further causing the operating value of $$\frac{M\sqrt{T_2}}{P_2}$$

to be further to the left of the Figure 1. Thus by suitably designing the valve 16 the peak efficiency curve P.E. could be followed.

Although the examples of the invention that have been described with reference to the drawings are concerned with axial flow compressors, the invention may be applied to other types of dynamic compressors e.g. radial flow compressors.

What I claim is:

1. A gas compressor plant comprising a rotary compressor having a row of stationary vanes, a first control pressure tapping in the leading edge of a stationary vane and facing in a direction towards the approaching working fluid, a second control pressure tapping in the throat of the working fluid passage between two adjacent vanes, and facing transversely to the direction of flow of working fluid, the first and second control pressure tappings thereby being sensitive respectively to total pressure head at the leading edge of the vane and static pressure head at the throat, a pressure responsive element, a communication between the pressure responsive element and the first control pressure tapping, a communication between the pressure responsive element and the second control pressure tapping, means to control the mass flow of working fluid through the compressor and a connection between the pressure responsive element and the mass flow control means whereby the mass flow through the compressor is controlled according to an operating condition of the compressor.

2. A compressor plant as claimed in claim 1 in which the pressure responsive element is incorporated in a housing, the element separating the housing into two pressure chambers and further comprising a connection between one of the pressure chambers and the first control pressure tapping, a connection between the other of said pressure chambers and the second control pressure tapping, a bleed duct connected to one of the pressure chambers, a valve in the bleed duct, and an operative connection between said valve and the compressor to control the opening of the bleed duct in response to an operating condition of the compressor.

3. A compressor plant as claimed in claim 2 in which the operative connection is a third pressure tapping duct communicating with the throat of the working fluid passage between adjacent stationary vanes.

4. A gas compressor plant comprising a rotary compressor having a row of stationary vanes, a first control pressure tapping constituted by a hole in the leading edge of a stationary vane and facing in a direction towards the approaching working fluid, said first control pressure tapping thereby being sensitive to total pressure head at the leading edge of the vane, a second control pressure tapping constituted by an opening in the wall of the throat of the working fluid passage between the two adjacent stationary vanes and facing transversely to the direction of flow of working fluid, said second control pressure tapping thereby being sensitive to static pressure head at the throat, an inlet duct to said compressor, an outlet duct from said compressor, a by-pass duct connected externally of said compressor between the inlet and outlet ducts, a control valve in said by-pass duct, a pressure responsive device connected to said pressure tappings and a connection between said pressure responsive device and said control valve whereby the mass flow through the by-pass duct and hence through the compressor is controlled according to an operating condition of the compressor.

5. A gas compressor plant comprising an axial flow compressor having a row of stator blades, a first control pressure tapping, said first control pressure tapping being constituted by a hole in the leading edge of a stator blade and facing in a direction towards the approaching working fluid, said first control pressure tapping thereby being sensitive to total pressure head at the leading edge of the blade, a second control pressure tapping, the second control pressure tapping being constituted by an opening in the wall of the throat of the working fluid passage between two adjacent stator blades and facing transversely to the direction of flow of working fluid, said control pressure tapping thereby being sensitive to static pressure at the throat, a pressure responsive device connected to the pressure tappings, a valve to control the mass flow through the compressor and a connection between said pressure responsive device and said valve operable to control the mass flow through the compressor.

References Cited in the file of this patent

UNITED STATES PATENTS

| | | |
|---|---|---|
| 1,111,498 | Rotter | Sept. 22, 1914 |
| 1,241,372 | Guyer | Sept. 25, 1917 |
| 1,281,216 | Schellens | Oct. 8, 1918 |
| 2,136,403 | Vance et al. | Nov. 15, 1938 |
| 2,344,835 | Stalker | Mar. 21, 1944 |
| 2,390,043 | Borden | Dec. 4, 1945 |
| 2,409,533 | Borden | Oct. 15, 1946 |
| 2,424,137 | Ball | July 15, 1947 |
| 2,470,565 | Loss | May 17, 1949 |
| 2,576,700 | Schneider | Nov. 27, 1951 |
| 2,659,528 | Price | Nov. 17, 1953 |
| 2,688,844 | McLeod | Sept. 14, 1954 |
| 2,732,125 | Ruby | Jan. 24, 1956 |
| 2,813,672 | Long et al. | Nov. 19, 1957 |

FOREIGN PATENTS

| | | |
|---|---|---|
| 918,317 | France | Oct. 14, 1946 |
| 1,104,204 | France | June 8, 1955 |